July 2, 1946.  W. P. LEAR  2,403,097

SYNCHRONIZED DIRECT CURRENT MOTOR SYSTEM

Filed Feb. 3, 1944  2 Sheets-Sheet 1

INVENTOR.
WILLIAM P. LEAR
BY Richard A. Marsan
ATTORNEY

July 2, 1946.  W. P. LEAR  2,403,097
SYNCHRONIZED DIRECT CURRENT MOTOR SYSTEM
Filed Feb. 3, 1944  2 Sheets-Sheet 2
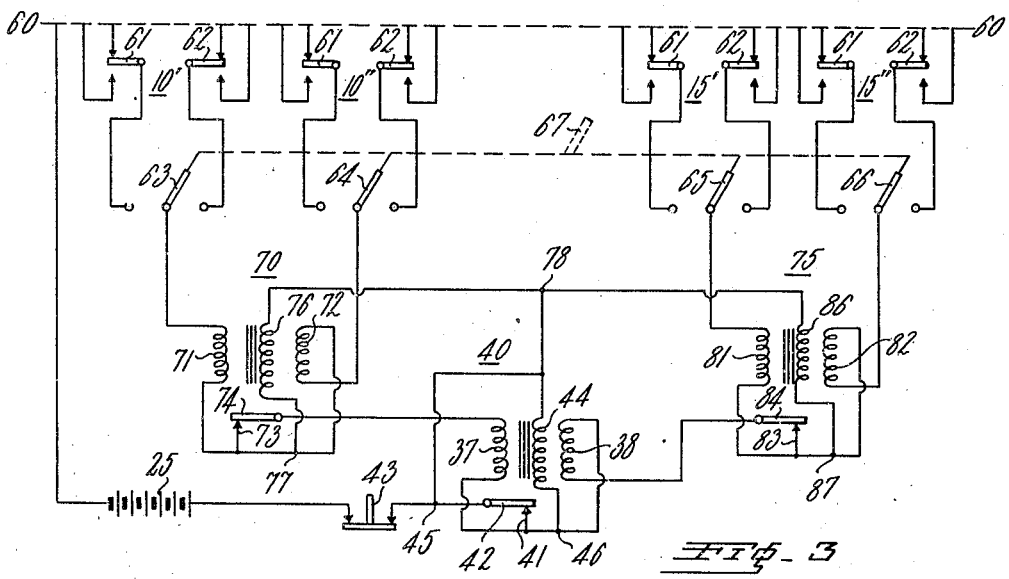
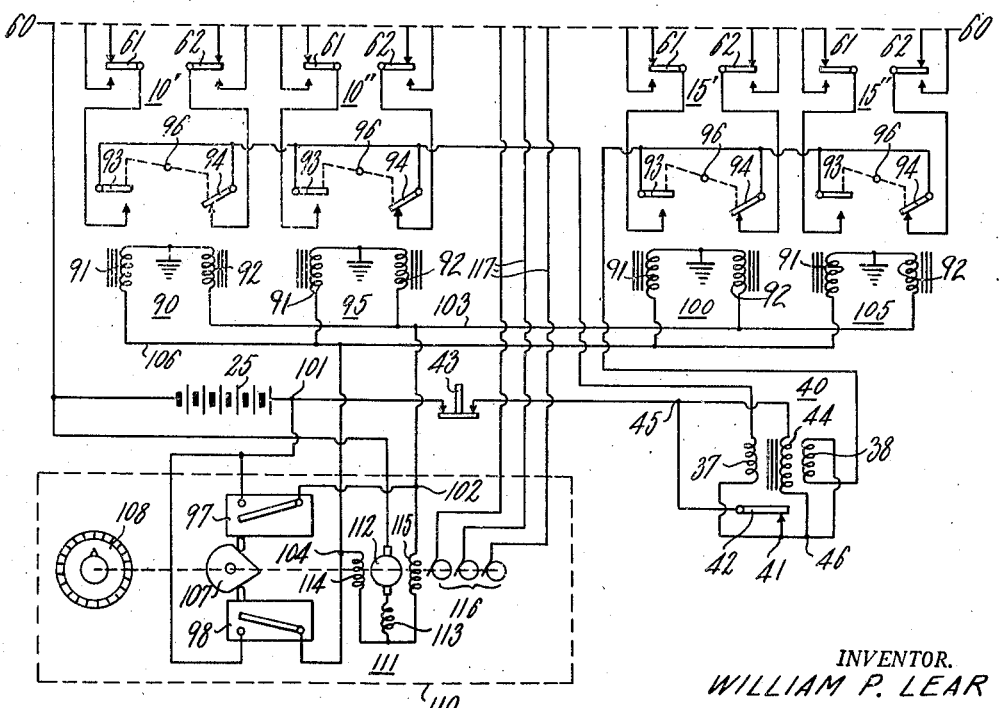
INVENTOR.
WILLIAM P. LEAR
BY
ATTORNEY

Patented July 2, 1946

2,403,097

UNITED STATES PATENT OFFICE 2,403,097

SYNCHRONIZED DIRECT CURRENT MOTOR SYSTEM

William P. Lear, North Hollywood, Calif., assignor, by mesne assignments, to Lear, Incorporated, Grand Rapids, Mich., a corporation of Illinois Application February 3, 1944, Serial No. 520,894

15 Claims. (Cl. 172—293)

This invention relates to synchronized direct current motor drive systems, and more particularly to such systems embodying anti-disparity controls for the motor drives.

The system of invention is particularly applicable to synchronously controlling the operation of groups of accessories on aircraft. The larger airplanes are provided with accessories, such as wing flaps, landing gear and so forth, that are operated in pairs, wherein each pair must be moved in synchronism and maintained in aligned relation, in order to provide effective control of the airplane. Where direct current motors are used, because of their superior torque and speed control characteristics, or because the available power source is direct current, the present invention provides a synchronizing control system for a plurality of such motor operators.

Various schemes have hitherto been proposed for synchronizing the operation of two or more direct current motor drives, maintaining them in step with each other. However, the systems heretofore proposed have not been effective to correct any disparity between the positions of the motors or to effect stoppage of the motors in the event that one or more thereof get out of synchronism with the others.

It is among the objects of this invention to provide a synchronizing arrangement for direct current motor drives, including anti-disparity controls; to provide such a system in which, if one motor drive is overloaded or otherwise draws an excessive amount of current, all of the motor drives will be deenergized and stopped; to provide such a system in which, if one motor drive reaches its limit of operation before the others, it will be deenergized and stopped without affecting the completion of operation of the other motor drives; to provide such a system embodying differential relay means for correcting disparity between the several motor drives; and to provide such a system including a remote positioning and control arrangement operatively associated therewith.

These and other objects, advantages and features of the invention will be apparent from the following description and accompanying drawings. In the drawings:

Fig. 3 is a schematic electric circuit arrangement of a modified anti-disparity control for the pairs of motor drives shown in Fig. 2.

Fig. 4 is a schematic electric circuit arrangement similar to Fig. 2, and including a remote position selecting and indicating control mechanism.

Figure 1:
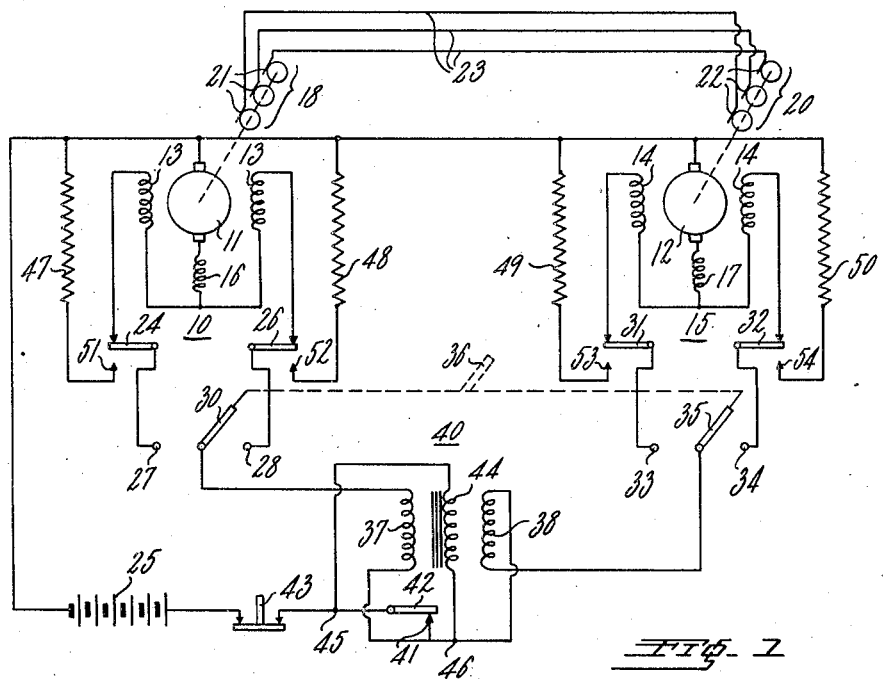
Fig. 1 is a schematic electric circuit arrangement for synchronizing the operation of two direct current motor drives, including anti-disparity control means.

Generally speaking, in the arrangement of the present invention, synchronizing circuit connections are provided between two or more direct current motors. Preferably, such synchronizing circuit connections include one or more slip rings rotatable with the armature of each direct current motor and connected to electrically equidistant points on the armature windings. Conductors and brush means are provided to interconnect corresponding slip rings of the several motors. To guard against disparity between the motor positions, differential relay means are provided. Such differential means preferably comprises one or more differential relays each having a pair of opposing coils, each of which is connected in series with one motor or with one pair of motors. The opposite terminals of the opposing relay coils are connected to the source of electric power through a back contact of the relay, which back contact is normally closed. A third coil is provided in each relay which is normally shunted by such back contact. Upon a substantial unbalance in the current requirements between each motor or between each pair of motors, the differential relay will operate to open its back contact. This deenergizes the opposing coils of the relay, disconnecting the motors from the source of power, except for a small holding current through the holding coil of the relay. Such holding coil maintains the back contact open until its holding circuit is interrupted by a suitable means.

The system is particularly applicable to the synchronous control of a plurality of mechanical actuator units, such as for operating wing flaps or other accessories of an aircraft, for instance as illustrated in my copending application Serial No. 490,136, filed June 9, 1943, for "Multiple actuator system," now Patent No. 2,366,734, issued January 9, 1945. For simplification of presentation, only the reversible direct current electric motors forming part of such actuator units are illustrated in the drawings. Such motors are shown at 10 and 15 as including armatures 11 and 12 and field windings 13, 13 and 14, 14. Field windings 13, 13 or 14, 14 are oppositely wound for selective reverse operation of armatures 11 and 12 respectively. As disclosed in said copending application Serial No. 490,136 and in my copending application Serial No. 483,515, filed April 17, 1943, for "Unitary mechanical actuator device," both assigned to the same assignee as this case, each of the motors 10 and 15 is adapted to be connected to a driven system, such as individual wing flaps, through a quick acting electromagnetic clutch and brake unit of the type described and claimed in my Patent No. 2,267,114, issued December 23, 1941, for "Electromagnetic clutch," and suitable reduction gearing. As described in said patent, the quick acting magnetic clutch and brake unit is also effective to cause substantially instantaneous stopping of the driven system upon deenergization of the motor and clutch through the medium of a spring snapping the clutch driven disk into engagement with a braking surface upon deenergization of the clutch. Such clutch and brake units are provided with magnetizing windings which, in the present instance, are diagrammatically illustrated at 16 and 17 as connected in series with armatures 11 and 12, respectively.

Synchronizing circuit connections are provided between motors 10 and 15. As shown, such synchronizing circuit connections comprise slip rings 18 and 20 which are rotatable with the armatures 11 and 12, respectively. In a manner not shown for the purpose of simplifying the drawings, rings 18 and 20 are connected to electrically equi-distant points of the windings of armatures 11 and 12 as will be understood by those skilled in the art. Brushes 21 and 22 operatively engage slip rings 18 and 20, respectively. The brushes are interconnected by conductors 23. The operation of the synchronizing arrangement is as follows. Upon a difference in the relative phase relation of armatures 11 and 12, a circulating current will flow through conductors 23 causing a slowing down of the faster motor with respect to the slower motor, or vice versa. This arrangement maintains motors 10 and 15 in synchronous rotation. However, under severe conditions, the synchronizing force may be insufficient and motors 10 and 15 may get out of step to destroy the synchronous relation of the drives. To prevent this, an anti-disparity control arrangement is provided by the present invention.

As shown, one terminal of each of the direct current motors 10 and 15 is connected to one terminal of the source of power diagrammatically illustrated at 25 as comprising a battery. Motor armatures 11 and 12 are connected in series with field windings 13, 13 and 14, 14, respectively. Field windings 13 are connected through limit switches 24 and 26 to opposite terminals 27 and 28 of a reversing switch 30. Similarly, field windings 14 are connected through limit switches 31 and 32 to opposite terminals 33 and 34 of a reversing switch 35. Limit switches 24, 26, 31 and 32 may be mounted in the control boxes of the linear actuator unit illustrated in my above mentioned copending application Serial No. 483,515 and, as therein described, may be operated through suitable reduction gearing connected to the actuator and motor of such units. Desirably, reversing switches 30 and 35 are ganged together for unitary operation, as indicated at 36.

The anti-disparity control for the system of Fig. 1 comprises a differential relay 40 having opposing low resistance coils 37 and 38. One terminal of coil 37 is connected in series circuit relation with switch 30, and one terminal of coil 38 is connected in series circuit relation with switch 35. The opposite terminals of coils 37 and 38 are connected to a contact 41 normally engaged by an armature 42 forming part of relay 40. Armature 42 is connected through a normally closed push button 43 to the opposite terminal of source of power 25. Relay 40 likewise includes a third, or holding coil 44 having one terminal connected through a junction point 45 and push button 43 to source 25. Coil 44 is of higher resistance than coils 37, 38. The opposite terminal is connected through junction point 46 in series with coils 37 and 38. It will be noted that armature 42 normally shunts holding coil 44.

The operation of the system of Fig. 1 is as follows. Under normal operation, wherein both motors 10 and 15 are drawing substantially equal currents, coils 37 and 38 of relay 40 will be substantially equally energized in opposite directions, and armature 42 will remain in contact with contact 41. Should motor 10, for instance, draw a substantially different amount of current than motor 15, due to unbalanced load or drive conditions, relay 40 will become unbalanced. Such unbalance will cause armature 42 to be drawn from engagement with contact 41. The shunt circuit is thus removed from coil 44, retaining the armature 42 in its open position. Motors 10 and 15 are thus disconnected from source of power 25. A small current continues to flow in series through coil 44 and coils 37 and 38. The motors are thus deenergized as are the clutches, and disconnected from their driven members through the clutches operated by their coils 16 and 17.

Another possible condition is that the motors continue to draw substantially equal current, but that the one reaches its end limit of operation of driving before the other. Should motor 10, for instance, reach its limit before motor 15, its associated limit switch 24 or 26 will be opened depending upon the direction of its rotation. Opening of such limit switch will cut motor 10 from source of power 25. Normally, the resulting unbalanced condition of relay 40 would likewise cut motor 15 from the source of power. However, resistances 47, 48, 49 and 50 are connected in parallel with motors 10 and 15. Resistances 47, 48, 49 and 50 are preferably made substantially equal in value to the running resistance of motors 10 or 15. When any one of limit switches 24, 26, 31, 32 is opened, it engages a back contact 51, 52, 53 or 54 which inserts one of the said resistances in series with the corresponding opposing coil 37 or 38 of relay 40. Hence, if limit switch 24 opens, it engages contact 51 and places resistance 47 in series with opposing coil 37. As resistance 47 is substantially equal in value to the running resistance of motor 15, no unbalance of differential relay 40 will occur despite continued operation of the other motor 15. Motor 15 will thus be permitted to operate until it reaches its limit of operation and opens its limit switch 31 or 32, whereupon motor 15 also will be disconnected from source 25. The system may be reset, after all motors have been disconnected from the source of power, by depression of push-button 43 which breaks the holding circuit for relay coil 44, permitting armature 42 to drop back into engagement with contact 41.

As mentioned hereinabove, the described arrangement is particularly valuable for use aboard aircraft for operating in synchronism various accessories in pairs, such as wing flaps, dual rudders, multiple landing gear and so forth. Such elements must be motivated in synchronism or step without any substantial disparity between the members of each group. If the invention arrangement is used, for instance, to control the position of a pair of wing flaps through the medium of linear actuator units as illustrated in my said Patent No. 2,366,734, any substantial disparity between the positions of the wing flaps will cause a deenergization and instantaneous stopping of both motors 10 and 15 before any amount of disparity can occur to cause faulty control of the airplane. Through the electromagnetic clutch and brake arrangement used with the present invention, and described in my above mentioned Patent No. 2,267,114, deenergization of the motors effects instantaneous stopping of the driven elements connected thereto. Normally, an operating tolerance up to about 30% disparity is permissible for the operation of wing flaps. The invention system may be designed to be sensitive, or for disparity control well within the range of practicable disparity between a pair of wing flaps.

Figure 2:
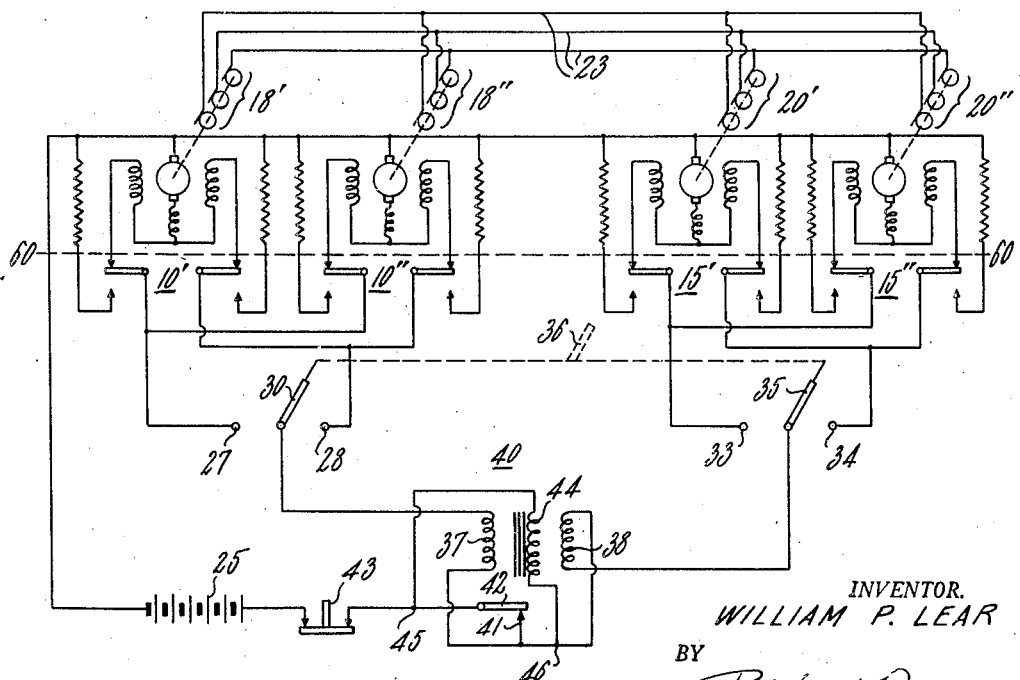
Fig. 2 is a schematic electric circuit arrangement for synchronizing the operation of two pairs of direct current motor drives including anti-disparity control means.

Fig. 2 illustrates how the arrangement of Fig. 1 may be used to control the operation of two pairs of direct current motor drives. The arrangement of Fig. 2 might be used, for instance, to control "inboard" and "outboard" pairs of wing flaps on an airplane with one pair of motors controlling the position of the "inboard" flaps and the other pair that of the "outboard" flaps. The arrangement is basically the same as that of Fig. 1. The first pair of motors may include motors 10' and 10" connected in parallel with each other to the terminals 27 and 28 of a reversing switch 30. The second pair of motor drives may include motors 15' and 15" connected in parallel to the terminals 33 and 34 of a reversing switch 35. As in Fig. 1, reversing switches 30 and 35 may be ganged as at 36. Motors 10' and 10" are provided with slip rings 18' and 18", and motors 15' and 15" are provided with slip rings 20' and 20". Synchronizing circuit connections 23 are provided as in Fig. 1. With the exception of the differences herein described, the system shown in Fig. 2 is essentially the same as that shown in Fig. 1. Each of the motors is provided with opposing field windings, with a clutch brake unit and operating coil, and with a resistance operatively associated with each of the limit switches. To simplify the illustration, these elements are not described in detail.

Upon a substantial difference in the current requirement of the first pair of motors with respect to the second, relay 40 will operate to disengage its armature 42 through its contact 41 cutting all of the motors from the source of power 25. Similarly, if any one motor reaches its limit of operation before the other motors, its associated limit switch will insert a corresponding resistance in the circuit connected to the differential relay 40, thus permitting the other motors to keep on operating, until their limiting positions are reached. As in Fig. 1, upon operation of relay 40, coil 44 maintains armature 42 disengaged from contact 41 until such time as its holding circuit is broken by the push button 43.

Fig. 3 illustrates an arrangement for preventing disparity between each motor of a pair of motors or of two pairs of motors. For simplification, that portion of the motor and synchronizing circuits above the dash line 60—60 of Fig. 2 has been omitted in Fig. 3, but is understood to be similar to the showing thereof in Fig. 2. Each of the motors is provided with limit switches 61 and 62. Each pair of limit switches is connected to the opposite terminals of a reversing switch 63, 64, 65 or 66. The reversing switches are ganged together for operation as a unit as indicated at 67. In this instance, an additional pair of differential relays 70 and 75 are provided. Relay 70 prevents disparity between the left-hand pair of motors 10', 10"; and relay 75, between the right-hand pair of motors 15', 15". Relay 40, in this instance, prevents disparity of the left-hand pair of motors 10', 10" with respect to the right-hand pair of motors 15', 15". Relay 70 includes opposing coils 71 and 72 connected in series with reversing switches 63 and 64, respectively. The opposite terminals of coils 71 and 72 are connected to contact 73 normally engaged by armature 74. A holding coil 76 is provided having one terminal connected through junction point 77 to contact 73 and the other terminal to a junction point 78. Relay 75 is provided with opposing coils 81 and 82 connected in series with reversing switches 65 and 66, respectively. The opposite terminals of coils 81 and 82 are connected in parallel to contact 83 normally engaged by armature 84. A holding coil 86 is provided having one contact connected through junction point 87 to contact 83 and its opposite terminal connected to junction point 78. The junction point 78 is connected in series with holding coil 44 of relay 40. As in the systems of Figs. 1 and 2, holding coil 44 has one terminal connected to junction point 45 and the other terminal connected to junction point 46 and is normally shunted by armature 42 and contact 41.

The operation of the system of Fig. 3 is as follows. If there is a substantial disparity in the current requirements of motors 10' and 10", relay 70 will be energized in the same manner as previously described, to attract its armature 74. Armature 74 will be held open by coil 76 through a holding circuit including junction point 77 and 78. The resulting current unbalance created in relay 40 will cause opening of its armature 42 which is held open by holding coil 44. Opening of armature 42 will cause all of the motors 10', 10", 15' and 15" to be disconnected from the source of power 25. Restoration of the system to normal is effected by depression of push-button 43 breaking the holding circuit for coils 44 and 76. A similar operation, through relay 75, takes place upon a disparity between motors 15' and 15".

Should either motor reach its limit of operation before any of the other motors, its limit switch will open and, as in the systems of Figs. 1 and 2, a resistance, equivalent to the motor running resistance, will be inserted in series with the associated coil 71 of relay 70 or 75. Accordingly, no operation of the relays will take place. That motor will stop and the other motors will continue to operate. If thereafter another motor reaches its limit of operation and opens its limit switch, an equivalent resistance is again inserted in series with its associated relay coil, and no operation of relay 70 or 75 occurs and the remaining motors continue to operate until they reach their limit of operation.

Fig. 4 illustrates how the system of Fig. 2 may have incorporated therein a position preselecting and indicating control of the type described and claimed in my copending application Serial No. 432,195, filed February 25, 1942, for "Preselection control mechanism," now Patent No. 2,355,381, issued August 8, 1944, which is assigned to the same assignee as this case. As in Fig. 3, the portion of the motors illustrated above the line 60—60 of Fig. 2 has been omitted to simplify the drawing, but is understood to be similar to the showing thereof in Fig. 2. Each of the motors is adapted to be connected to the source of power 25 through the medium of interlocking relays 90, 95, 100 and 105. Each interlocking relay includes coils 91 and 92, operatively associated with armatures 93 and 94, respectively, which are interlocked as diagrammatically illustrated at 96. Armatures 93 and 94 control the direction of energization of the several motors. The armatures of relays 90 and 95 are connected in parallel with each other and in series with opposing coil 37 of relay 40. Similarly, the armatures of relays 100 and 105 are connected in parallel with each other and in series with opposing coil 38 of relay 40.

The control of the motors 10', 10'', 15' and 15'' in this instance is by a position preselection mechanism 110 of the type described and claimed in my said Patent No. 2,355,381. Mechanism 110 includes a pair of switches 97, 98 each having one terminal connected to one side of source 25 through junction point 101. The opposite terminal of switch 97 is connected to junction point 102. Junction point 102 is connected to conductor 103 which connects coils 92 of the interlocking relays in parallel. The opposite terminal of switch 98 is connected to a junction point 104, and this junction point is connected to a conductor 105, which connects coils 91 of the interlocking relays in parallel. Hence, depending upon which of the switches 97 or 98 is closed, coils 91 or 92 of the interlocking relays will be energized. Correspondingly, armatures 93 or 94 of the relays will be operated to energize the motors for operation in one direction or the other.

Switches 97 and 98 are operated by means of a cam 107 which is arranged to be rotated by a preselection control knob 108. As described in my said Patent No. 2,355,381, cam 107 is adapted to be moved back to a neutral position by a reversible series-type direct current motor 111 in synchronous operation with the actuator motors. Motor 111 includes an armature 112 connected in series with a coil 113 which may be the energizing winding of an electromagnetic clutch and brake unit of the type described and claimed in my said Patent 2,267,114. Coil 113 is connected in series with field windings 114 and 115 which control the direction of operation of motor 111. Windings 114 and 115 are connected respectively to junction points 104 and 102. Accordingly, motor 111 is energized through one or the other of the windings depending upon which one of switches 97 or 98 is closed. In the same manner as are motors 10', 10'', 15' and 15'', motor 111 is provided with synchronizing slip rings 116 which are connected through conductors 117 to conductors 23 of the synchronizing connections for the main motors. Accordingly, motor 111 is maintained in substantial synchronism with motors 10', 10'', 15' and 15''.

The operation of the system of Fig. 4 is as follows. Knob 108 is turned to preselect the desired position of the members driven by the motors 10', 10'', 15' and 15''. Operation of knob 108 turns cam 107 in a direction to close one of the switches 97 or 98. This energizes motor 111 through one of its field windings 114 or 115, and the motors 10' through 15'' through the interlocking relays 90, 95, 100 and 105. All the motors, including motor 111, operate in synchronism until such time as motor 111 has moved cam 107 back to the neutral position shown in the drawings. At such time, switch 97 or 98 is opened to open the circuit of motor 111 and deenergize the interlocking relays. Thus all motor drives are stopped at the preselected position; and the clutches disengage and brake units re-engage, to leave the driven members at such position. The use of self-braking action on clutch disengagement assures locking of the members in their synchronous positions, and avoids overshooting or hunting.

Should a substantial current unbalance exist between the pair of motors 10', 10'' and the pair of motors 15', 15'', relay 40 will become unbalanced and attract its armature 42 to break the circuit for all of the motors including motor 111. Relay armature 42 will remain attracted through holding coil 44 until such time as push-button 43 is depressed to reset the system for continued operation. Thus disparity, between the motors and drives, within desired limits of design, is avoided.

It will be noted that the anti-disparity synchronizing systems disclosed disconnect all motors of a group from the source of power upon a substantial disparity in the current requirements of the motors. However, should one drive reach its limit of operation just before the others, this will not affect the operation of the other motors. Such other motors will continue to operate, independently of the first motor, until they likewise reach their limits of operation. Through a judicious selection of the appropriate number of differential relays, any number of direct current motor drives or any number of groups of motor drives may be kept in synchronous relation with anti-disparity control.

While specific embodiments of the invention have been described and shown to illustrate the application of the principles thereof, it will be understood by those skilled in the art that the invention may be otherwise embodied without departing from such principles.

What is claimed is:

1. A control circuit for a plurality of motors comprising, in combination, a pair of electric motors each having a terminal connected to one terminal of a source of power; synchronizing circuit connections between said motors; a differential relay having a pair of opposing coils each connected in series with one of said motors, said coils being connected to the opposite terminal of the source of power through a back contact of said relay; said differential relay being effective, upon a current unbalance between said motors, to open said back contact and disconnect said motors from said source of power; a limit switch in series with each motor and effective, when open, to deenergize its associated motor; and a resistance associated with each motor having a value substantially equal to the running resistance of the associated motor; each limit switch, upon opening to deenergize its associated motor, being effective to insert one of said resistances in series with its associated differential relay coil, whereby said differential relay will remain energized to maintain the other motor connected to said source of power until its limit switch opens.

2. A control circuit for a plurality of motors comprising, in combination, a pair of electric motors each having a terminal connected to one terminal of a source of power; synchronizing circuit connections between said motors; a differential relay having a pair of opposing coils each connected in series with one of said motors, said coils being connected to the opposite terminal of the source of power through a back contact of said relay; said differential relay being effective, upon a current unbalance between said motors, to open said back contact and disconnect said motors from said source of power; a limit switch in series with each motor and effective, when open, to deenergize its associated motor; a resistance associated with each motor having a value substantially equal to the running resistance of the associated motor; each limit switch, upon opening to deenergize its associated motor, being effective to insert one of said resistances in series with its associated differential relay coil, whereby said differential relay will remain energized to maintain the other motor connected to said source of power until its limit switch opens; means effective upon opening of said back contact to retain the same open; and switch means effective to close said back contact.

3. A control circuit for a plurality of motors comprising, in combination, a first pair of electric motors; a second pair of electric motors; synchronizing circuit connections between all said motors; each motor having a terminal connected to one terminal of a source of power; a first differential relay having a pair of opposing coils each connected in series with one of the motors of said first pair; a second differential relay having a pair of opposing coils each connected in series with one of the motors of said second pair; and a third differential relay having a pair of opposing coils; the opposing coils of said first and second relays each being connected through a back contact of their associated relay in series with one coil of said third relay; the opposing coils of said third relay each being connected to the opposite terminal of the source of power through a back contact of said third relay; said first differential relay being effective upon a substantial current unbalance between the motors of said first pair to open its back contact and disconnect said first pair of motors from the source of power; said second differential relay being effective upon a substantial current unbalance between the motors of said second pair to open its back contact and disconnect said second pair of motors from the source of power; and said third differential relay being effective upon a substantial current unbalance between said pairs of motors to open its back contact and disconnect all of said motors from the source of power.

4. A control circuit for a plurality of motors comprising, in combination, a pair of electric motors each having a terminal connected to one terminal of a source of power; synchronizing circuit connections between said motors; a differential relay having a pair of opposing coils each connected in series with one of said motors, said coils being connected to the opposite terminal of the source of power through a back contact of said relay; said differential relay being effective, upon a current unbalance between said motors, to open said back contact and disconnect said motors from said source of power; and a holding coil incorporated in said differential relay and having one terminal connected to the opposite terminal of the source of power and its other terminal connected in series with each of the opposing coils of said relay; said back contact normally shunting said holding coil.

5. A control circuit for a plurality of motors, comprising, in combination, a pair of reversible electric motors each having a terminal connected to one terminal of a source of power; synchronizing circuit connections between said motors; a reversing switch associated with each motor for controlling its direction of rotation; a differential relay having a pair of opposing coils each connected in series with one of said reversing switches; said coils being connected to the opposite terminal of the source of power through a back contact of said relay; said differential relay being effective, upon a current unbalance between said motors, to open said back contact and disconnect said motors from the source of power; and a holding coil incorporated in said differential relay and having one terminal connected to the opposite terminal of the source of power and its other terminal connected in series with each of the opposing coils of said relay; said back contact normally shunting said holding coil.

6. A control circuit for a plurality of motors comprising, in combination, a pair of reversible electric motors each having a terminal connected to one terminal of a source of power; synchronizing circuit connections between said motors; interlocking relay means associated with each motor for controlling its direction of rotation; and a differential relay having a pair of opposing coils each connected in series with one of said interlocking relay means; said coils being connected to the opposite terminal of the source of power through a back contact of said relay; said differential relay being effective, upon a current unbalance between said motors, to open said back contact and disconnect said motors from the source of power.

7. A control circuit for a plurality of motors comprising, in combination, a pair of reversible electric motors each having a terminal connected to one terminal of a source of power; synchronizing circuit connections between said motors; interlocking relay means associated with each motor for controlling its direction of rotation; a differential relay having a pair of opposing coils each connected in series with one of said interlocking relay means; said coils being connected to the opposite terminal of the source of power through a back contact of said relay; said differential relay being effective, upon a current unbalance between said motors, to open said back contact and disconnect said motors from the source of power; and a holding coil incorporated in said differential relay and having one terminal connected to the opposite terminal of the source of power and its other terminal connected in series with each of the opposing coils of said relay; said back contact normally shunting said holding coil.

8. A control circuit for a plurality of motors comprising, in combination, a pair of electric motors each having a terminal connected to one terminal of a source of power; synchronizing circuit connections between said motors; a limit switch in series with each motor and effective, when open, to deenergize its associated motor; a resistance associated with each motor having a value substantially equal to the running resistance of the associated motor; a differential relay; said differential relay having a pair of opposing coils each connected in series with one of said motors and said coils being connected to the opposite terminal of the source of power through a back contact of said relay and being effective, upon a current unbalance between said motors, to open said back contact and disconnect said motors from the source of power; each limit switch, upon opening to deenergize its associated motor, being effective to insert one of said resistances in series with its associated differential relay coil; and a holding coil incorporated in said differential relay and having one terminal connected to the opposite terminal of the source of power and its other terminal connected in series with each of the opposing coils of said relay; said back contact normally shunting said holding coil.

9. A control circuit for a plurality of motors, comprising, in combination, a pair of reversible electric motors each having a terminal connected to one terminal of a source of power; synchronizing circuit connections between said motors; a limit switch in series with each motor and effective, when open, to deenergize its associated motor; a resistance associated with each motor having a value substantially equal to the running resistance of the asssociated motor; a reversing switch associated with each motor for controlling its direction of rotation; a differential relay having a pair of opposing coils each connected in series with one of said reversing switches; said coils being connected to the opposite terminal of the source of power through a back contact of said relay; each limit switch, upon opening to deenergize its associated motor; being effective to insert one of said resistances in series with its associated differential relay coil; said differential relay being effective, upon a current unbalance between said motors, to open said back contact and disconnect said motors from said source of power.

10. A control circuit for a plurality of motors, comprising, in combination, a pair of reversible electric motors each having a terminal connected to one terminal of a source of power; synchronizing circuit connections between said motors; a limit switch in series with each motor and effective, when open, to deenergize its associated motor; a resistance associated with each motor having a value substantially equal to the running resistance of the associated motor; a reversing switch associated with each motor for controlling its direction of rotation; a differential relay having a pair of opposing coils each connected in series with one of said reversing switches; said coils being connected to the opposite terminal of the source of power through a back contact of said relay; said differential relay being effective, upon current unbalance between said motors, to open said back contact and disconnect said motors from said source of power; each limit switch, upon opening to deenergize its associated motor, being effective to insert one of said resistances in series with its associated differential relay coil; and a holding coil incorporated in said differential relay and having one terminal connected to the opposite terminal of the source of power and its other terminal connected in series with each of the opposing coils of said relay; said back contact normally shunting said holding coil.

11. A control circuit for a plurality of motors, comprising, in combination, a pair of reversible electric motors each having a terminal connected to one terminal of a source of power; synchronizing circuit connections between said motors; a limit switch in series with each motor and effective, when open, to deenergize its associated motor; a resistance associated with each motor having a value substantially equal to the running resistance of the associated motor; interlocking relay means associated with each motor for controlling its direction of rotation; a differential relay having a pair of opposing coils each connected in series with one of said interlocking relay means; said coils being connected to the opposite terminal of the source of power through a back contact of said relay; said differential relay being effective, upon a current unbalance between said motors, to open said back contact and disconnect said motors from said one terminal of the source of power; each limit switch, upon opening to deenergize its associated motor, being effective to insert one of said resistances in series with its associated differential relay coil.

12. A control circuit for a plurality of motors, comprising, in combination, a pair of reversible electric motors each having a terminal connected to one terminal of a source of power; synchronizing circuit connections between said motors; a limit switch in series with each motor and effective, when open, to deenergize its associated motor; a resistance associated with each motor having a value substantially equal to the running resistance of the associated motor; interlocking relay means associated with each motor for controlling its direction of rotation; a differential relay having a pair of opposing coils each connected in series with one of said interlocking relay means; said coils being connected to the opposite terminal of the source of power through a back contact of said relay; said differential relay being effective, upon a current unbalance between said motors, to open said back contact and disconnect said motors from said one terminal of the source of power; each limit switch, upon opening to deenergize its associated motor, being effective to insert one of said resistances in series with its associated differential relay coil; and a holding coil incorporated in said differential relay and having one terminal connected to the opposite terminal of the source of power and its other terminal connected in series with each of the opposing coils of said relay; said back contact normally shunting said holding coil.

13. A control circuit for a plurality of motors comprising, in combination, a pair of reversible electric motors each having a terminal connected to one terminal of a source of power; synchronizing circuit connections between said motors; a remote position selecting unit in circuit with said motors; said unit comprising a pair of switches for effecting rotation of said motors in opposite directions, a cam operatively associated with said switches, position selecting means operative to displace said cam to selectively operate said switches, and a reversible motor operative when energized to restore said cam to a neutral position, said switches controlling the energization and direction of rotation of the motor of said unit; synchronizing circuit connection between the motor of said unit and said first mentioned motors; and a differential relay having a pair of opposing coils each connected in series with one of said first-mentioned motors; said coils being connected to the opposite terminal of the source of power through a back contact of said relay; said differential relay being effective, upon a current unbalance between said first-mentioned motors to open said back contact and disconnect said first-mentioned motors from the source of power.

14. A control circuit for a plurality of motors comprising, in combination, a pair of reversible electric motors each having a terminal connected to one terminal of a source of power; synchronizing circuit connections between said motors; interlocking relay means associated with each motor for controlling its direction of rotation; a remote positioning and selecting unit in circuit with said interlocking relay means, said unit comprising a pair of switches each operative to energize said interlocking relay means for effecting rotation of said motors in opposite directions, a cam operatively associated with said switches, position selecting means operative to displace said cam to selectively operate said switches, and a reversible motor operative when energized to restore said cam to a neutral position, said switches controlling the energization and direction of rotation of the motor of said unit; synchronizing circuit connections between the motor of said unit and said first-mentioned motors; a differential relay having a pair of opposing coils each connected in series with one of said interlocking relay means; said coils being connected to the opposite terminal of the source of power through a back contact of said relay; said differential relay being effective, upon a current unbalance between said first-mentioned motors, to open said back contact and disconnect said first-mentioned motors from the source of power.

15. A control circuit for a plurality of motors comprising, in combination, a pair of reversible electric motors each having a terminal connected to one terminal of a source of power; synchronizing circuit connections between said motors; interlocking relay means associated with each motor for controlling its direction of rotation; a remote positioning and selecting unit in circuit with said interlocking relay means, said unit comprising a pair of switches each operative to energize said interlocking relay means for effecting rotation of said motors in opposite directions, a cam operatively associated with said switches, position selecting means operative to displace said cam to selectively operate said switches, and a reversible motor operative when energized to restore said cam to a neutral position, said switches controlling the energization and direction of rotation of the motor of said unit; synchronizing circuit connections between the motor of said unit and said first-mentioned motors; a differential relay having a pair of opposing coils each connected in series with one of said interlocking relay means; said coils being connected to the opposite terminal of the source of power through a back contact of said relay; said differential relay being effective, upon a current unbalance between said first-mentioned motors, to open said back contact and disconnect said first-mentioned motors from the source of power; a holding coil incorporated in said differential relay having one terminal connected to the opposite terminal of the source of power and its other terminal connected in series with each of the opposing coils of said relay; said back contact normally shunting said holding coil; said holding coil being effective upon opening of said back contact to retain the same open; and switch means effective to deenergize said holding coil to close said back contact.

WILLIAM P. LEAR.